United States Patent [19]

Kizuki et al.

[11] Patent Number: 5,684,829
[45] Date of Patent: Nov. 4, 1997

[54] DIGITAL SIGNAL PROCESSING CODING AND DECODING SYSTEM

[75] Inventors: Takafumi Kizuki, Yokosuka; Toshihiro Maruyama, Kawasaki; Susumu Takahashi, Tokyo, all of Japan

[73] Assignee: Victor Company of Japan, Ltd., Tokyo, Japan

[21] Appl. No.: 582,696

[22] Filed: Jan. 4, 1996

[30] Foreign Application Priority Data

Jan. 27, 1995 [JP] Japan .................................. 7-31435

[51] Int. Cl.$^6$ .................................................. H04B 14/04
[52] U.S. Cl. .................................... 375/242; 341/64
[58] Field of Search ................................. 375/242, 243, 375/244, 245, 254, 246–253, 296, 340, 316; 341/50, 64, 143, 200, 51, 52; 370/10, 69.1, 74, 77, 98, 110.1, 110.4

[56] References Cited

U.S. PATENT DOCUMENTS 5,444,741 8/1995 Mahieux ................................ 375/254
5,550,812 8/1996 Phillips .................................. 375/362

OTHER PUBLICATIONS

On the Use of Windows for Harmonic Analysis with the Discrete Fourier Transform—Proceedings of the IEEE, vol. 66, No. 1 Jan. 1978, Fredric J. Harris, Member, IEEE.

*Primary Examiner*—Stephen Chin
*Assistant Examiner*—Hai H. Phan
*Attorney, Agent, or Firm*—Michael N. Meller

[57] ABSTRACT

A signal coding system capable of high efficiency, high quality signal coding is provided. Digital signals represented in the time domain are divided into set time interval data units and output. One output is converted to a digital signal represented in the frequency domain, and the other is output as-is. The energy dispersion of the digital signal represented in the frequency domain is compared with that of the digital signal represented in the time domain, and the digital signal having the least energy dispersion is coded. This coded digital signal is then multiplexed with an identification signal to identify it as a frequency domain or time domain signal, and the resulting multiplexed signal is output.

7 Claims, 8 Drawing Sheets

Constant-type Sound
(e.g. a wind and string instrument)

Time Domain
Energy Dispersion: Large

Frequency Domain
Energy Dispersion: Small

Impulse-type Sound (e.g. Percussion instrument)

Time Domain
Energy Dispersion: Small

Frequency Domain
Energy Dispersion: Large

First Frame   Second Frame   Third Frame
Frequency Domain     Frequency Domain
Time Domain

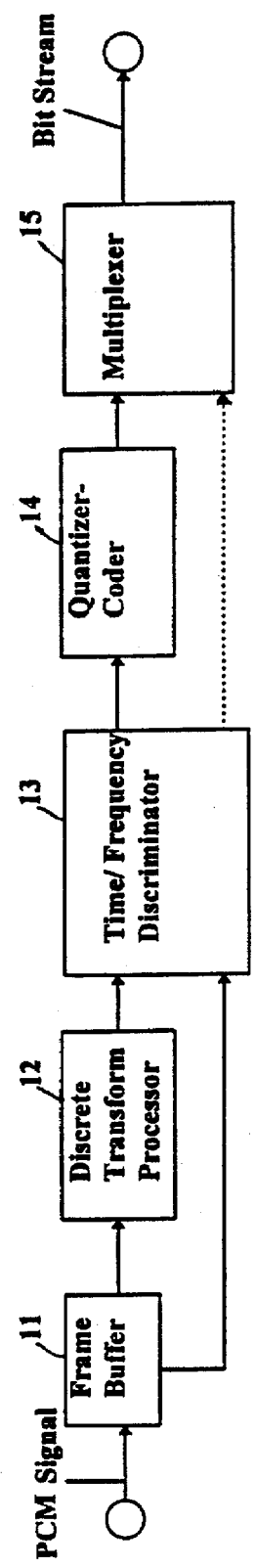
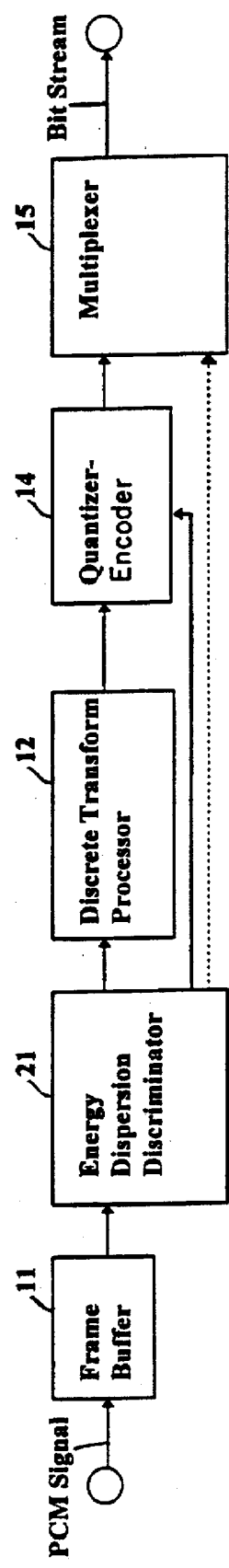
FIG. 5
FIG. 6

DIGITAL SIGNAL PROCESSING CODING AND DECODING SYSTEM

BACKGROUND OF THE INVENTION

1. Field of the Invention

This invention relates to signal encoding and decoding system that compresses and decompresses the information content of a pulse-code-modulated (PCM) digital signal.

2. Description of the Prior Art

There exists in the art, as a method of converting an analog audio signal into a digital signal, a time domain representation method wherein the amplitude of the analog signal is quantized into discrete units of quantity by sampling it at fixed time intervals.

With such methods that represent signals in the time domain only, however, the volume of data in the resulting digital signal is large, and neither the data transmission signal band nor the storage capacity of the storage media can be reduced. There are, therefore, a number of methods that may be considered for compressing such digital signals in the time domain.

The main methods for audio signal coding are subband coding (SBC), in which the signal is coded by dividing the signal into subbands, and advanced transformation coding (ATC) in which the signal is coded by adaptive transformation. In both SBC and ATC coding, an audio signal input as a time series (time domain) signal is transformed to the frequency domain, and then coded using the uneven dispersion of energy across a wide band in the frequency domain.

That is, as shown in FIG. 1(A), the energy of a constant-type sound signal, such as that produced by a wind or string instrument, is widely dispersed in the time domain, and a large amount of data would therefore be required to code it. If, however, a discrete transform of the above constant-type tone is taken to convert it to the frequency domain, as shown in FIG. 1(B), the extent of the energy dispersion is small, and it therefore requires only a small amount of data to express it.

In this coding method, data compression is performed by allocating a large number of bits (information) to the coding of frequency bands (subbands) that have a large amount of energy, and few bits to subbands that have little energy, or that are audibly unimportant.

FIG. 2 shows an example of a signal coding system that performs such transform coding, and FIG. 3 shows an example of a system that decodes the resulting signal. These systems are described below.

In the system of FIG. 2, an input digital audio signal (PCM signal) represented in the time domain is supplied to frame buffer 1, where it is windowed weighted by a window function and output, frame-by-frame.

In the windowing process, window functions such as Hanning Window and Hamming Window are applied to the input audio signal of a continuous time-series signal to weight its amplitude, and is divided into "frames," the units in which subsequent signal processing is performed (see F. J. Harris, "On the Use of Windows for Harmonic Analysis with the Discrete Fourier Transform.", Proc. IEEE, vol.66, no. 1, pp.51–83, 1978; Mikio Takagi and Haruhisa Shimoda, "Gazoh Kaiseki Handbook", Tokyo Daigaku Shuppan, pp20–25, 1991).

The output of frame buffer 1 is then supplied frame-by-frame to discrete transform processor 2, where a discrete transform such as the discrete cosine transform (DCT), discrete Fourier transform (DFT), Karhunen-Loeve transform (KLT) etc. is performed on the signal, to transform it to the frequency domain. Finally, in quantizer-coder 3, the output of discrete transform processor 2 is converted to a bit stream in which most of the bits are allocated to portions of the frequency spectrum that contain large amounts of energy, or that are audibly important.

With transform coding, when the signal is transformed to the frequency domain, the more uneven the dispersion of energy across the spectrum, the higher the compression ratio. It is therefore desirable to use the discrete transform with the highest transformation efficiency. The KLT transform has the highest "ideal" efficiency, but in terms of practical efficiency (number of calculations, etc.) it is about the same as the DCT. Therefore, the transform that is normally used is actually the DCT, which has the highest to computation speed.

In the signal decoding system shown in FIG. 3, the bit stream received at the decoding system input is a digital audio signal represented in the frequency domain. This input is supplied to inverse quantizer-decoder 4, where it is decoded. The output of inverse quantizer-decoder 4 is fed to inverse discrete transform processor 5, where its inverse discrete transform is returned to the time domain; i.e. the inverse discrete cosine transform (IDCT), inverse discrete Fourier transform (IDFT), or inverse Karhunen-Loeve transform (IKLT), etc., as applicable, is transformed. The output of inverse discrete transform processor 5 is inverse-windowed by frame buffer 6, and output as a decoded digital audio signal represented in the time domain.

The inverse windowing process multiplies each frame of the signal by the inverse of the function used to window it, thereby restoring the amplitude of the audio signal to its original state removing the window components.

Thus the information content of a constant-type tone audio signal, as shown in FIG. 1(A) and FIG. 1(B), can be compressed by performing a discrete transform to translate the signal to the frequency domain. As shown in FIG. 4(A), however, in impulse-type sound signals such as produced by percussion instruments, the energy dispersal in the time domain is small and the energy is unevenly distributed. If the discrete transform of this type of audio signal is taken, to translate it to the frequency domain, the energy will be widely dispersed, as shown in FIG. 4(B). This was a problem with the conventional system, in that for this type of signal, rather than being improved, the compression efficiency was actually reduced.

Another problem with this system was that in impulse-type sound signals, when portions having abrupt energy changes were coded in the frequency domain, a type of noise referred to as "pre-echo noise" was produced in the low energy portions of the signal, degrading the coding quality.

BRIEF SUMMARY OF THE INVENTION

1. Object of the Invention

It is the object of this invention to effect high efficiency, high quality signal coding and decoding by switching between the time and frequency domains of the digital signal, depending on the nature of the input digital signal, to perform the coding.

2. Brief Summary

Provided, according to a first aspect of this invention, is a signal coding system for coding an input digital signal, comprising: a data accumulation means for dividing an input digital signal represented in a time domain into set time intervals, and outputting said signal; a discrete transform processing means for transforming a digital signal received from said data accumulation means into a digital signal represented in a frequency domain; a discrimination means for determining whether an input digital signal is a constant-type digital signal or an impulse-type digital signal, and for concurrently outputting an identification signal indicating the result of this determination; a coding means that if, based on the identification signal supplied from said discrimination means, said input digital signal is found to be a constant-type signal, codes said digital signal converted by said discrete processing means for representation in said frequency domain, and if said input digital signal is found to be an impulse-type sound-type signal, codes said digital signal represented in said time domain; and a multiplexing means for multiplexing said digital signal coded by said coding means with said identification signal.

Further provided, according to a second aspect of this invention, is a signal coding system for coding input digital signals comprising: a data accumulation means for dividing an input digital signal represented in a time domain into set time intervals, and outputting said signal; a discrimination means for determining whether a digital signal received from said data accumulation means is a constant-type digital signal or an impulse-type digital signal, and for concurrently outputting an identification signal indicating the result of this determination; a discrete transform processing means for transforming a digital signal received from said discrimination means into a digital signal represented in a frequency domain; a coding means that if, based on the identification signal received from said discrimination means, said input digital signal is found to be a constant-type signal, codes said digital signal converted by said discrete processing means for representation in said frequency domain, and if said input digital signal is found to be an impulse-type sound-type signal, codes said digital signal represented in said time domain; and a multiplexing means for multiplexing said digital signal coded by said coding means with said identification signal.

Still further provided, according to a third aspect of this invention, is a signal decoding system for decoding a digital signal divided into set time intervals containing a mixture of digital signals represented in the frequency domain and digital signals represented in the time domain and coded in this mixed state, and also having multiplexed therein, identification signals that identify the content of each time interval as either a time domain or a frequency domain signal, comprising: a separation means for separating an input digital signal into said coded digital signal and said identification signal portions; a decoding means for decoding said coded digital signal received from said separation means; a discrimination means for determining whether a digital signal received from said decoding means is represented in the frequency domain or in the time domain, based on said identification signal received from said separation means; an inverse discrete transform processing means for converting a digital signal received from said discrimination means represented in the frequency domain to a digital signal represented in the time domain; and an output means for outputting, in time series sequence, digital signals represented in the time domain received from said inverse discrete transform processing means, and digital signals represented in the time domain received from said discrimination means.

The invention determines, for each transform coding frame, whether the sound represented therein is constant-type sound or impulse-type sound by comparing the extent of its energy dispersion in the frequency domain with the extent of its energy dispersion in the time domain, and codes the data in the frequency domain if it is constant-type sound, and codes it in the time domain if it is impulse-type sound, and by so doing, improves the coding quality and coding efficiency over that which could be realized by coding in the frequency domain only.

The above and other related objects and features of the invention will be apparent from a reading of the following description of the found in the accompanying drawings, and the novelty thereof pointed out in the appended claims.

BRIEF DESCRIPTION OF THE DRAWINGS

FIG. 5 is a block diagram showing one embodiment of the signal coding system of the present invention.

FIG. 6 is a block diagram showing another embodiment of the signal coding system of the present invention.

DETAILED DESCRIPTION OF THE INVENTION

The preferred embodiment of the present invention is described in detail below, based on the accompanying drawings.

One Embodiment of the Signal Coding System

FIG. 5 is a block diagram showing one embodiment of the signal coding system of the present invention. In FIG. 5, the input digital audio signal represented in the time domain is supplied to frame buffer 11, where it is windowed frame-by-flame, and output.

In the windowing process, the input audio signal (a continuous time-series signal) is multiplied by window functions such as Harming window and Hamming window to weight its amplitude, and is then divided into "frames,"

which are the data units on which subsequent signal processing will be performed(see F. J. Harris, "On the Use of Windows for Harmonic Analysis with the Discrete Fourier Transform.", Proc. IEEE, vol.66, no. 1, pp.51–83, 1978; Mikio Takagi and Haruhisa Shimoda, "Gazoh Kaiseki Handbook", Tokyo Daigaku Shuppan, pp.20–25, 1991).

One of the outputs of frame buffer 11 is supplied frame-by-frame to discrete transform processor 12, where a discrete transform such as the discrete cosine transform (DCT), discrete Fourier transform (DFT), Karhunen-Loeve transform (KLT) etc. is performed on the signal to map it to the frequency domain, after which it is output to time/frequency discriminator 13. The other output of frame buffer 11 is sent, still a time domain signal, to time/frequency discriminator 13.

Figure 9:
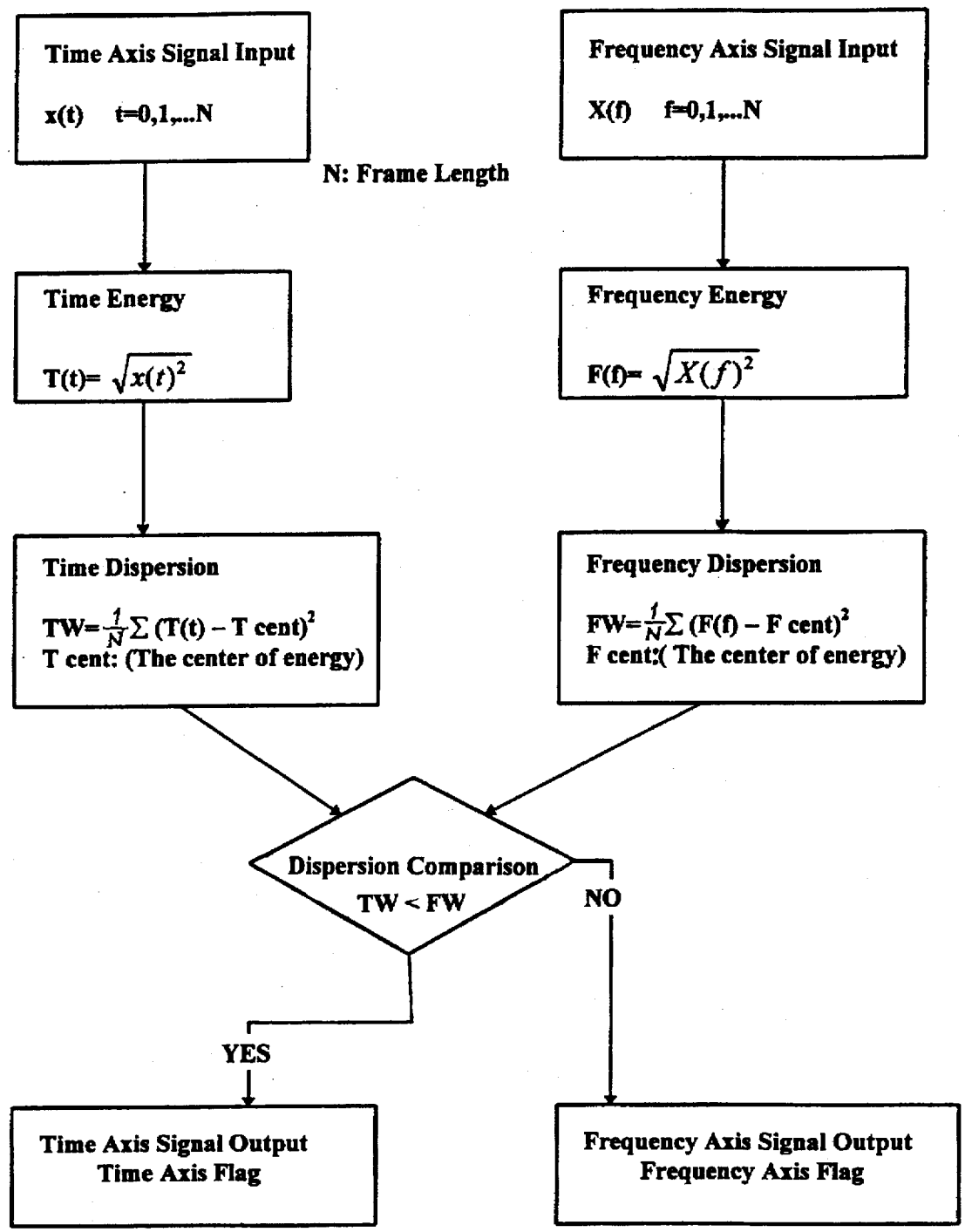
FIG. 9 is a diagram for explaining one example of a time frequency discriminator as shown in FIG. 5.

Time/frequency discriminator 13 compares the energy dispersion in the frequency domain signal received from discrete transform processor 12 with the energy dispersion in the time domain signal received directly from frame buffer 11, and outputs, to quantizer-coder 14, the signal having less widely dispersed energy. At the same time, time/frequency discriminator 13 also outputs an identification flag to multiplexer 15 to identify the signal being sent to as a time domain signal or a frequency domain signal Now, the two signals input to time/frequency discriminator 13, are, as indicated in FIG. 9, a time axis signal x(t) {t=0, 1, . . . . , N (where N is the frame length)}, and a frequency axis signal X(f) {f=0, 1, . . . , N (where N is the frame length)}, each having time energy T(t), and frequency energy S(f), respectively, which are given by the following equations:

$$T(t) = \sqrt{x(t)^2} \quad (1)$$

$$F(f) = \sqrt{X(f)^2} \quad (2)$$

Also, time dispersion TW and frequency dispersion FW are given by the following equations:

$$TW = \frac{1}{N} \Sigma (T(t) - Tcent)^2 \quad (3)$$

where Tcent is the center of energy concentration in the time domain $$FW = \frac{1}{N} \Sigma (F(f) - Fcent)^2 \quad (4)$$

where Fcent is the center of energy concentration in the frequency domain

The above "time dispersion" value indicates the time variance of the energy content of the frame with respect to the center of energy concentration on the time axis, and the "frequency dispersion" value indicates the frequency variance of the energy content of the frame with respect to the center of energy concentration on the frequency axis.

The magnitudes of the time dispersion TW and frequency dispersion FW determined as described above are then compared, and the signal in the domain having less energy dispersion is output, along with its corresponding flag. That is, if the time dispersion (TW) is less, the time axis signal and flag are output, and if the frequency dispersion (FW) is less, the frequency axis signal and flag are output.

Since time/frequency discriminator 13 of FIG. 5 outputs the signal in the domain having the least energy dispersion (frequency or time), then a) if the input is a constant-type sound signal, the frequency domain signal will be selected, and b) if the input is an impulse-type sound signal, the time domain signal will be selected.

Figure 1A:
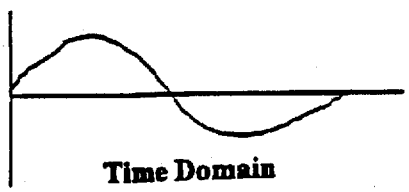
FIG. 1(A) is a waveform diagram showing the waveform of a constant-type sound signal, and in particular, the waveform of the signal in the time domain.
Figure 1B:
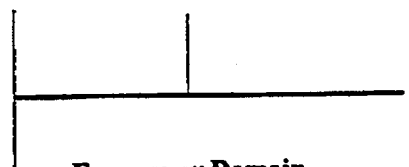
FIG. 1(B) is a waveform diagram showing the waveform of a constant-type sound signal, and in particular, the waveform of the signal in the frequency domain.
Figure 4A:
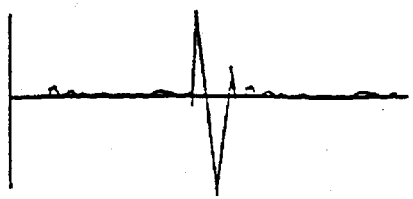
FIG. 4(A) is a waveform diagram showing the waveform of an impulse-type sound signal, and in particular, the waveform of the signal in the time domain.
Figure 4B:
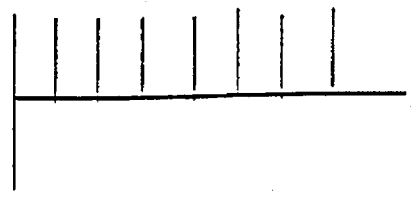
FIG. 4(B) is a waveform diagram showing the waveform of an impulse-type sound signal, and in particular, the waveform of the signal in the frequency domain.
Figure 8:
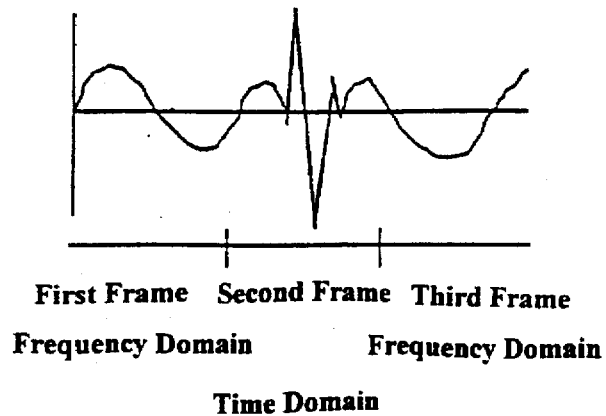
FIG. 8 is a waveform diagram showing an example of a signal having a mixture of constant-type sound and impulse-type sound.
Figure 2:
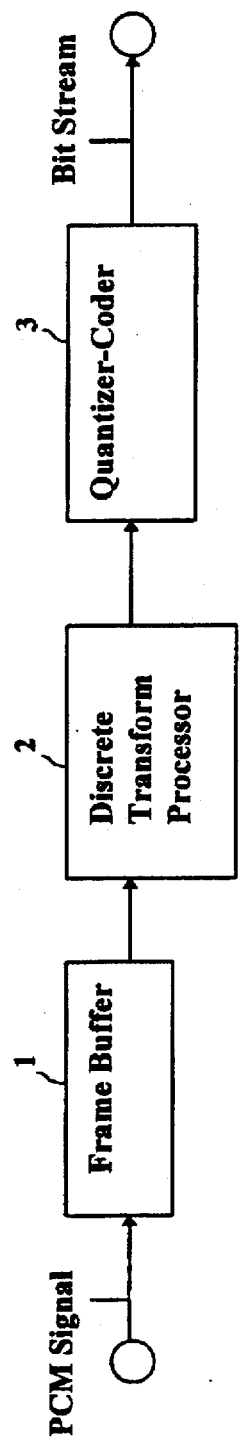
FIG. 2 is a block diagram showing an example of a signal coding system that performs transform coding.
Figure 3:
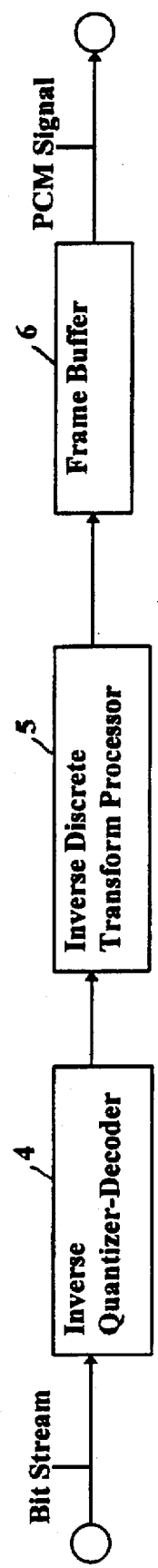
FIG. 3 is a block diagram showing an example of a signal decoding system.

Accordingly, if the system received an audio input signal containing a mix of both constant-type and impulse-type sound-type signals, such as that shown in FIG. 8, the output signal selected for the first and third frames would be the frequency domain signal, and that selected for the second frame output would be the time domain signal.

In quantizer-coder 14, quantization is performed such that portions of the input signal spectrum that have a large mount of energy and portions that are important for auditory perception are allocated most of the available bits, and the resulting signal is then output to multiplexer 15.

Multiplexer 15 multiplexes the time/frequency identification flag received from time/frequency discriminator 13 frame-by-frame with the Signal received from quantizer-coder 14, and outputs the result as a bit stream. The time/frequency identification flag consists of one bit header, which added ahead of the data bits.

As described above, then, the signal coding system of this invention is capable of performing efficient coding of audio signals containing a mixture of constant-type and impulse-type sound components. Also, since impulse-type sound, which gives rise to abrupt energy changes, is coded in the time domain, the disturbances referred to as pre-echo noise do not occur, thus preventing the degradation of quality normally associated therewith.

Another Embodiment of the Signal Coding System

Next, another embodiment of the signal coding system of the present invention will be explained, with reference to FIG. 6. The parts of the system that are the same as in the embodiment that was described above using FIG. 5 are assigned the same reference numbers as in FIG. 5, and are not discussed here.

In FIG. 6, an input digital audio signal represented in the time domain is supplied to frame buffer 11, where it is windowed frame-by-frame, and output. The output of frame buffer 11 is supplied to energy dispersion detector 21.

Energy dispersion detector 21 determines whether the level of energy dispersion in the input digital audio signal is above or below a predetermined energy dispersion value (threshold level), and concurrently outputs, to multiplexer 15, a flag indicating which of these two conditions exists.

If the energy dispersion exceeds the threshold level, the signal is determined to represent constant-type sound, in which case the output of energy dispersion detector 21 is supplied frame-by-frame to discrete transform processor 12, where a discrete transform (DCT, DFT, KIT, etc.) of the signal is performed to map it to the frequency domain for output to quantizer-encoder 14. If the energy dispersion is less than the threshold level, the signal represents impulse-type sound, in which case the output of energy dispersion detector 21 is sent as-is (in the time domain), to quantizer-encoder 14.

The signal input to quantizer-coder 14 is quantized and output to multiplexer 15. Multiplexer 15 multiplexes the time/frequency identification flag output from energy dispersion detector 21 frame-by-frame with the signal received from quantizer-coder 14, and outputs the result as a bit stream.

Thus as explained above, the result obtained in the embodiment of FIG. 6 is the same as in the embodiment of FIG. 5.

Other Discrimination Methods

In both of the embodiments described above, the determination as to whether the input signal represented constant or impulse-type sound was made by detecting the amount of energy dispersion in the digital signal. This determination, however, may just as well have been performed by other methods.

In constant-type audio, for example, the decay curve of the envelope is usually gradual, and the envelope of an impulse-type signal has a sharp rising edge.

Alternate Method 1

Accordingly, the differences in the amounts of energy at various frequencies in a digital signal represented in the frequency domain can be determined. A signal with large energy differences can then be classified as a constant-type sound signal, and one in which the differences are not too great as an impulse-type signal. This method can be implemented by simply changing the time/frequency discriminator 13 in the signal coding system of FIG. 5.

Figure 10:
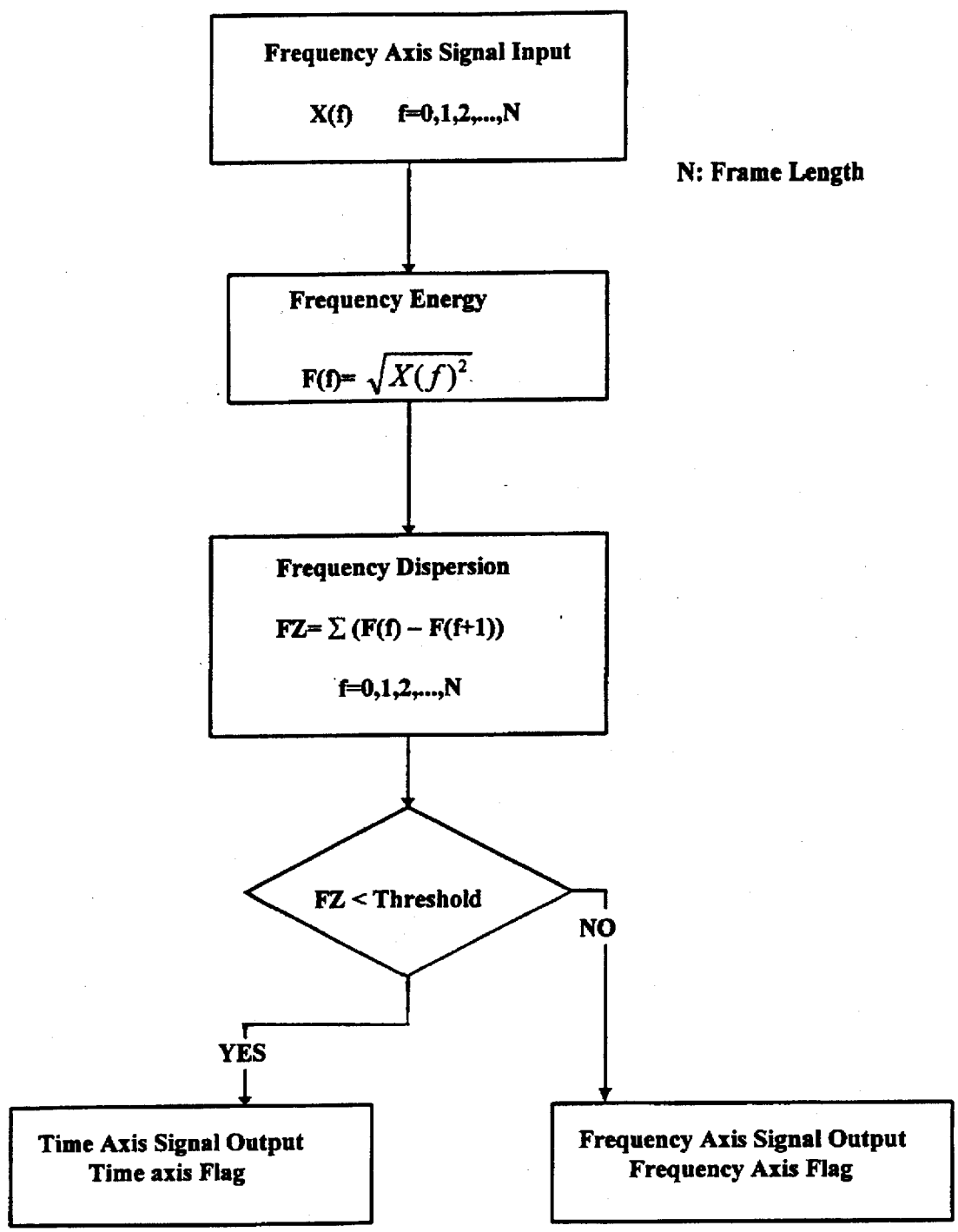
FIG. 10 is a diagram for explaining another example of a time frequency discriminator as shown in FIG. 5.

In this case, as shown in FIG. 10, a frequency axis signal X(f) {f=0, 1, ..., N (where N is the frame length)} is input to time/frequency discriminator 13, and the frequency energy F(f) computed using equation (1), above. The total of the energy differences between adjacent frequency components on the frequency axis FZ is then calculated, using the following equation:

$$FZ = \Sigma(F(f) - F(f+1)) \quad (5)$$

$$f = 1, 2, \ldots, N$$

The total of the energy differences calculated as indicated above is then compared with a threshold level that has been set in advance. If the total of the energy differences FZ is less than the threshold level, the signal is considered impulse-type sound, and it is output as a time axis signal, along with the corresponding flag. Conversely, if the total of the energy differences FZ exceeds the threshold level, the signal is judged as a constant-type sound signal, and is output as a frequency axis signal, along with that flag.

Alternate Method 2

In a digital signal represented in the time domain, the difference between present and preceding amplitudes can be detected, and the difference compared against a set value. Signals in which the difference falls below, and those in which the difference falls above the threshold level would then be processed as constant, and impulse-type sound signals, respectively. The signal coding system for this method can be configured by simply changing the energy dispersion detector 21, as shown in FIG. 6.

Figure 11:
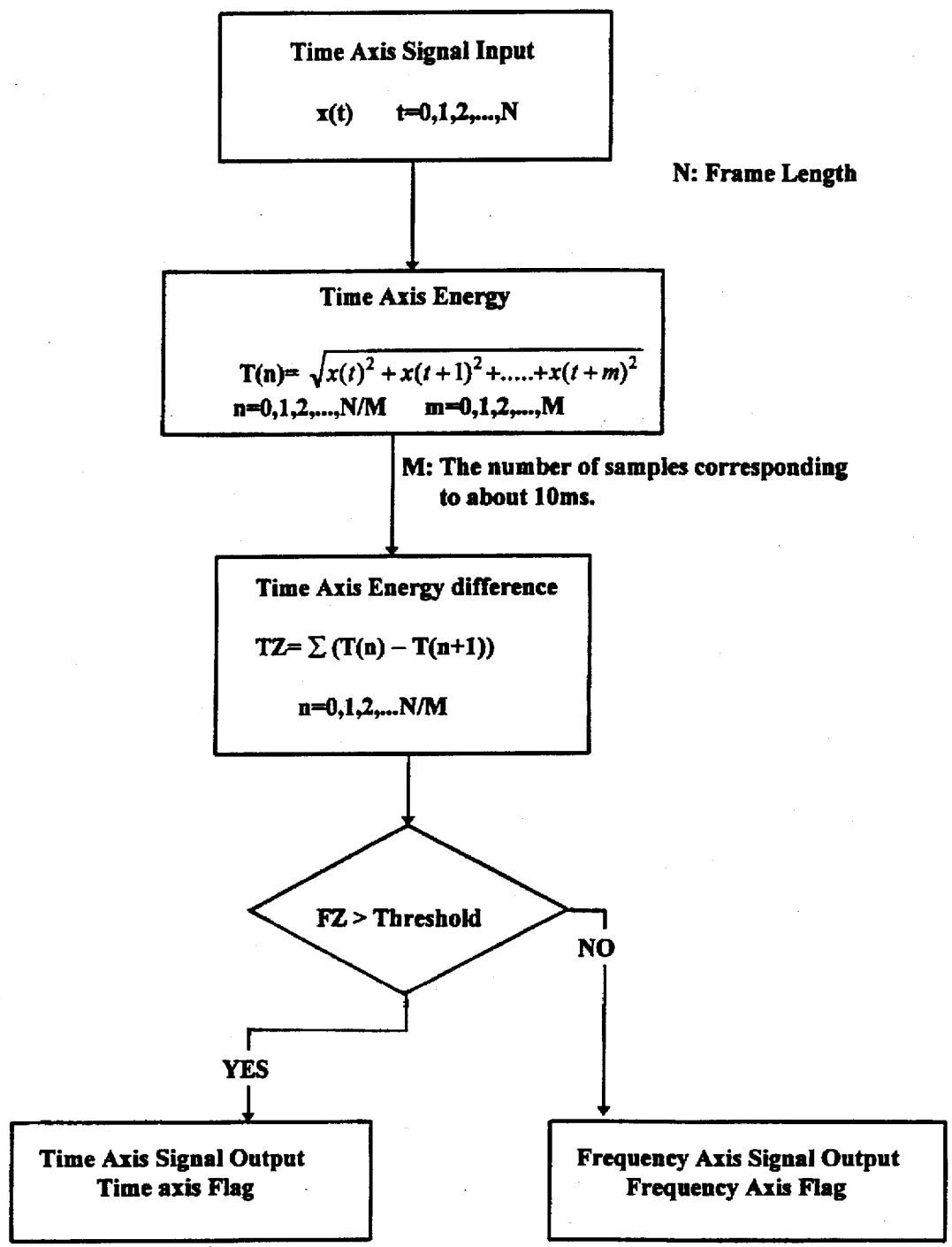
FIG. 11 is a diagram for explaining one example of an energy dispersion detector as shown in FIG. 6.

In this case, as indicated in FIG. 11, in energy dispersion detector 21, a time axis signal x(t) {t=0, 1, ..., N (where N is the frame length)} is input, and time axis energy T(n) calculated by the following equation:

$$T(n) = \sqrt{x(t)^2 + x(t+1)^2 + \ldots + x(t+m)^2} \quad (6)$$

where M is the number of samples corresponding to about 10 ms.

The total of the differences between the average energy levels of adjacent fixed interval samples M (about 10 ms) on the time axis, TZ, is then calculated by the following equation:

$$TZ = \Sigma(T(n) - T(n+1)) \quad (7)$$

$$n = 1, 2, \ldots N/M$$

The total of the average energy differences TZ, determined as indicated above, is then compared with a threshold level set in advance. If the total of the average energy differences TZ is less than the threshold level, the signal is considered a constant-type sound signal, and is output as a frequency axis signal, along with the corresponding flag. Conversely, if the total of the energy differences TZ exceeds the threshold level, the signal is judged an impulse-type sound signal, and is output as a time axis signal, with that flag.

Alternate Method 3

Another possible method finds the auto-correlation coefficients of the frames of a digital signal represented in the time domain. Those signals with high auto-correlation are then classified as constant-type sound, and those low auto-correlation as impulse-type sound. With this method as well, it is necessary only to change energy dispersion detector 21 of FIG. 6 to configure the signal coder system.

Figure 12:
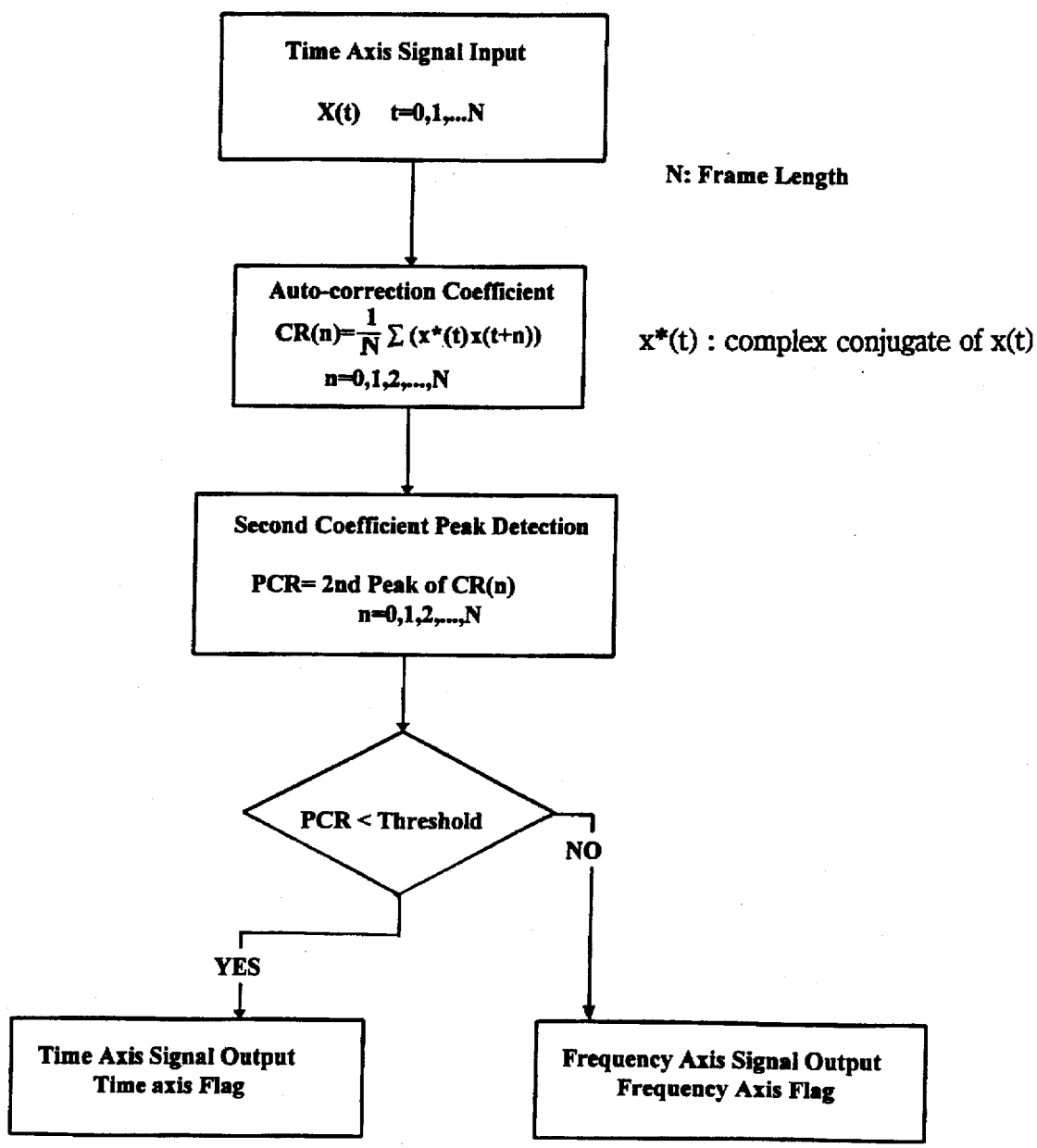
FIG. 12 is a diagram for explaining another example of an energy dispersion detector as shown in FIG. 6.

In this case, as indicated in FIG. 12, in energy dispersion detector 21, a time axis signal x(t) {t=0, 1, ..., N (where N is the frame length, in bits)} is input, and its auto-correlation coefficient CR(n) is calculated, using the following equation:

$$CR(n) = \frac{1}{N} \Sigma(x^*(t)x(t+n)) \quad (8)$$

$$n = 0, 1, 2, \ldots, N$$

x*(t): complex conjugate of x(t)

The magnitude of the coefficient's second peak PCR is then detected.

$$PCR = 2\text{nd peak of } CR(n) \quad (9)$$

$$n = 1, 2, \ldots, N$$

The magnitude of the detected second peak PCR is then compared with a threshold level set in advance. If the magnitude of the second coefficient peak is less than the threshold level, the signal is considered an impulse-type sound signal, and is output, along with the corresponding flag, as a time axis signal. Conversely, if the magnitude of the second peak of the coefficient PCR is greater than the threshold level, the signal is determined to be a constant-type sound signal, and is output as a frequency axis signal, along with that flag.

An Embodiment of the Signal Decoding System

Figure 7:
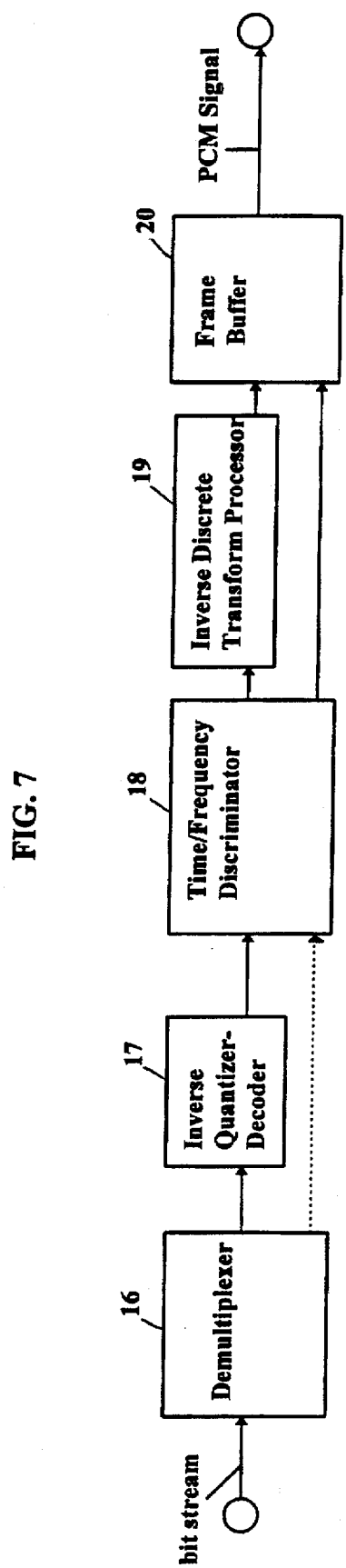
FIG. 7 is a block diagram showing one embodiment of the signal decoding system of the present invention.

An embodiment of the signal decoding system of the present invention is shown in FIG. 7 and explained below.

This signal decoding system is capable of decoding signals coded by any of the above described coding systems.

The signal decoding system of FIG. 7 is a decoding system for decoding a coded digital audio signal input received as a bit stream.

In FIG. 7, the input signal is supplied to demultiplexer 16, which divides the signal into the data signal and the time/frequency identification flag, which are then fed to inverse quantizer-decoder 17 and time/frequency discriminator 18, respectively.

Inverse quantizer-decoder 17 decodes the data signal and outputs result to time/frequency discriminator 18.

Time/frequency discriminator 18 decides whether the data signal it is receiving from inverse quantizer-decoder 17 is a frequency domain signal or a time domain signal, based on the time/frequency identification flag it receives from demultiplexer 16. If it is a frequency domain signal, it outputs it to inverse discrete transform processor 19, where an inverse discrete transform such as the inverse discrete cosine transform (IDCT), inverse discrete Fourier transform (IDFT), or the inverse Karhunen-Loeve transform (IKLT), is performed on it, to transform it to the time domain, after which it is output to frame buffer 6. If time/frequency discriminator 18 determines that the signal is a time domain signal, it outputs it as-is, directly to frame buffer 20.

Finally, the signal is inverse-windowed in frame buffer 20, and output as a digital audio signal represented in the time domain.

The inverse windowing process multiplies each frame of the signal by the inverse of the function used to window it, thereby restoring the amplitude of the audio signal to its original prewindowing state.

In this manner, the signal decoding system of the present invention can accurately decode a coded audio signal bit stream containing a mixture of frequency domain and time domain signals.

As described above, the signal coding system of the present invention is capable of efficiently coding audio signals that contain a mixture of constant-type sound and impulse-type sound signals. Also, since impulse-type sound data, which gives rise to abrupt energy changes, is coded in the time domain, so-called pre-echo noise does not occur, and the degradation of coding quality associated therewith is prevented.

In addition, since signals with little energy dispersion are selected, they can be used for a vector quantization (VQ) pre-process, utilizing the statistical bias of the spaces to generate the VQ code book.

In the signal decoding system of the present invention, the advantage is the system's capability to accurately decode a coded audio signal bit stream including a mixture of frequency domain and time domain signals.

What is claimed is:

1. A signal coding system for coding an input digital signal, comprising:
   a data accumulation means for dividing an input digital signal represented in a time domain into set time intervals, and outputting said signal;
   a discrete transform processing means for transforming a digital signal received from said data accumulation means into a digital signal represented in a frequency domain;
   a discrimination means for determining whether an input digital signal is a constant-type digital signal or an impulse-type digital signal, and for concurrently outputting an identification signal indicating the result of this determination;
   a coding means that if, based on the identification signal received from said discrimination means, said input digital signal is a constant-type signal, codes said digital signal transformed by said discrete transform processing means for representation in said frequency domain, and if said input digital signal is an impulse-type signal, codes said digital signal represented in said time domain; and
   a multiplexing means for multiplexing said digital signal coded by said coding means with said identification signal.

2. The signal coding system of claim 1, wherein said discrimination means compares the energy dispersion of said digital signal represented in the frequency domain and received from said discrete transform processing means with the energy dispersion of said digital signal represented in the time domain and received from said data accumulation means, and outputs the one of these two digital signals that has the least energy dispersion.

3. The signal coding system of claim 1, wherein said discrimination means determines the differences between the amounts of energy at various frequencies in said digital signal represented in the frequency domain and received from said discrete transform processing means, and classifies digital signals in which there are large energy differences as constant-type digital signal, and digital signals in which there are small energy differences as impulse-type digital signal.

4. A signal coding system for coding input digital signals comprising:
   a data accumulation means for dividing an input digital signal represented in a time domain into set time intervals, and outputting said signal;
   a discrimination means for determining whether a digital signal received from said data accumulation means is a constant-type digital signal or an impulse-type digital signal, and for concurrently outputting an identification signal indicating the result of this determination;
   a discrete transform processing means for transforming a digital signal received from said discrimination means into a digital signal represented in a frequency domain;
   a coding means that if, based on the identification signal received from said discrimination means, said input digital signal is a constant-type signal, codes said digital signal transformed by said discrete processing means for representation in said frequency domain, and if said input digital signal is an impulse-type signal, codes said digital signal represented in said time domain; and
   a multiplexing means for multiplexing said digital signal coded by said coding means with said identification signal.

5. The signal coding system of claim 4, wherein said discrimination means detects the difference between the immediately preceding amplitude and the present amplitude in digital signals represented in the time domain and received from said data accumulation means, and classifies digital signals in which said difference is below a predetermined value as constant-type digital signal, and those in which said difference is above said predetermined value as impulse-type digital signal.

6. The signal coding system of claim 4, wherein said discrimination means determines auto-correlation coefficients within frames of said digital signal represented in the time domain and received from said data accumulation means, and classifies digital signals having high auto-correlation as constant-type digital signal, and digital signals having low auto-correlation as impulse-type digital signal.

7. A signal decoding system for decoding a digital signal divided into set time intervals containing a mixture of digital signals represented in the frequency domain and digital signals represented in the time domain and coded in this mixed state, and also having multiplexed therein, identification signals that identify the content of each time interval as either a time domain or a frequency domain signal, comprising:
   a separation means for separating an input digital signal into said coded digital signal and said identification signal portions;

a decoding means for decoding said coded digital signal received from said separation means;

a discrimination means for determining whether a digital signal received from said decoding means is represented in the frequency domain or in the time domain, based on said identification signal received from said separation means;

an inverse discrete transform processing means for transforming a digital signal received from said discrimination means represented in the frequency domain to a digital signal represented in the time domain; and an output means for outputting, in time series sequence, digital signals represented in the time domain received from said inverse discrete transform processing means, and digital signals represented in the time domain received from said discrimination means.

* * * * *